United States Patent

Swiatosz et al.

[15] 3,675,343
[45] July 11, 1972

[54] FIRE FIGHTING AND CONTROL SIMULATOR

[72] Inventors: Edmund Swiatosz, Maitland; Walter S. Chambers, Winter Park, both of Fla.

[73] Assignee: The United States of America as represented by the Secretary of the Navy

[22] Filed: April 26, 1971

[21] Appl. No.: 137,293

[52] U.S. Cl. .................................................35/10, 169/1 R
[51] Int. Cl. ..............................................................G09b 9/00
[58] Field of Search .........................35/10, 13; 235/184, 185; 169/1 R, 1 A, 2 R

[56] References Cited

UNITED STATES PATENTS 3,359,652  12/1967  Prosser et al. ..............................35/10
3,451,147  6/1969  Mehlig et al. ..............................35/13
3,156,908  11/1964  Kopan et al. .........................169/1 R X Primary Examiner—Wm. H. Grieb
Attorney—Richard S. Sciascia and John W. Pease

[57] ABSTRACT

A simulator for training in fire fighting and control employing a plurality of modules arranged in a matrix of adjacent modules, each module employing a fire simulation unit, such as an electric lamp or gas burner energized to manually "on" condition with sensor and trigger circuit means for progressively deactivating the simulation units, time delay holding circuit means for maintaining deactivation of said units as the simulated fire is extinguished and interlocking logic circuitry with additional time delay means for limiting reflash capability of each "off" condition module fire simulation unit dependent upon the time duration of its exposure to "on" condition simulator units in adjacent modules.

6 Claims, 4 Drawing Figures

INVENTORS
EDMUND SWIATOSZ
WALTER S. CHAMBERS

INVENTORS
EDMUND SWIATOSZ
WALTER S. CHAMBERS

BY

ATTORNEY 3,675,343

FIRE FIGHTING AND CONTROL SIMULATOR

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATION

This invention is an improvement to the related application of Hanns H. Wolff, Ser. No. 122,399, filed Mar. 9, 1971 titled FIRE FIGHTING TRAINER.

BACKGROUND OF THE INVENTION

This invention relates to the field of simulators and more particularly to a simulator for instruction in the art of fighting and controlling oil spread fires.

In the past, fire fighting schools have used a diesel fuel oil as a fire source in the training of students in the technique of timed progressive extinguishing of fires. One disadvantage of the use of oil spread natural fires is the volume of black smoke and resulting pollution of the air. A further disadvantage is the hazard of reflash and resultant envelopment of the fire fighter particularly in fighting fires in enclosures. To avoid the above mentioned disadvantages, a system of fire simulation modules of gas or light units responsive to suitable sensor means has been developed by Dr. Hanns H. Wolff and disclosed in the above mentioned cross-referenced patent application, Ser. No. 122,399. In the above mentioned system there is provided the capability of simulation of an actual fire and progressive extinguishing of the fire to avoid reflash resulting from inadequate time duration of sensor activation for each fire simulation unit in a matrix of simulation modules, as well as a fixed time delay means to simulate reflash of the fire if all simulation units are not extinguished in the time period of the fixed time delay.

More realistic simulation of proper procedure in the extinguishment of a fire would be provided if each simulation unit was responsive to the actual "on" – "off" condition of adjacent units in the simulation of reflash potential of the fire.

SUMMARY OF THE INVENTION

To provide a further realistic feature in simulation of actual fire conditions, the present invention is directed to a matrix of fire simulation modules wherein in addition to sensor actuated fire simulation units with associated deactivation and holding circuit means, there is also combined interlocking logic circuitry including gate, trigger and additional time delay means to permit and inhibit reflash capability in each "off" condition module fire simulation unit in dependence upon the time duration of its exposure to "on" condition simulator units in adjacent modules.

DESCRIPTION OF THE PREFERRED EMBODIMENT

Figure 1:
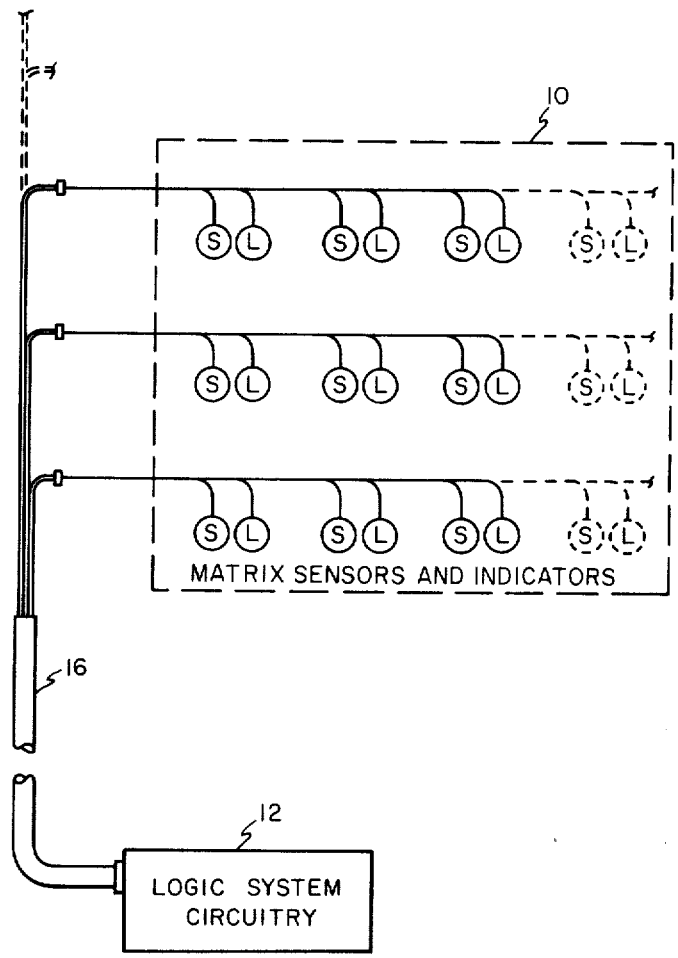
FIG. 1 illustrated diagrammatically a matrix of interconnected fire simulator units and associated sensors connected to a logic system circuitry and embodying the invention.
Figure 2:
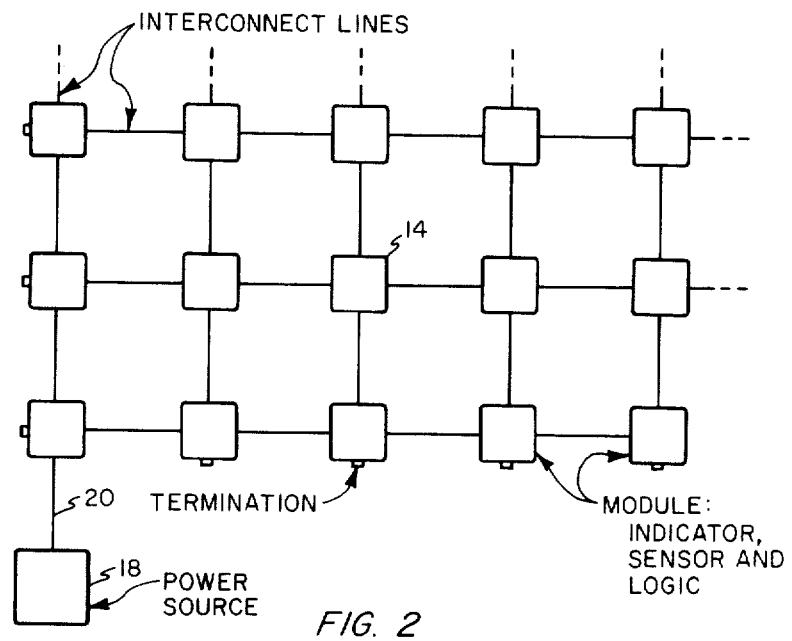
FIG. 2 illustrates diagrammatically an integrated arrangement of modules incorporated in the logic system circuitry of FIG. 1.

Referring to FIG. 1, the area covered by the simulated fire is shown by the dotted outline 10 and is represented by a matrix of pairs of sensors S and lights L. The number of nodes in the matrix is arbitrary and depends upon the total area of the fire desired. The logic system circuitry indicated at 12 comprises a plurality of interconnected identical logic modules 14, as shown in FIG. 2, each module being connected by cable means 16 (FIG. 1) to serve a sensor S and light L pair. Power for energizing the lights L is obtained from a suitable power source 18 (FIG. 2) via suitable connecting means 20. The spacing of the nodes, i.e., the pairs of lights and sensors, depends upon the time constants of the logic circuitry in accordance with the degree of realism desired for the simulator.

To control the operation of the lights L in accordance with realistic extinguishing of a fire, each module 14 of the logic system is provided with means for initially activating the lights L to normally "on" condition, deactivating means for extinguishing each light progressively responsive to action of its associated sensor, holding circuit means for holding the light in "off" condition for a selected period of time and interlocking circuitry for permitting and inhibiting reflash capability of each "off" condition light in dependence upon the light conditions in adjacent areas of the simulated fire.

Figure 3:
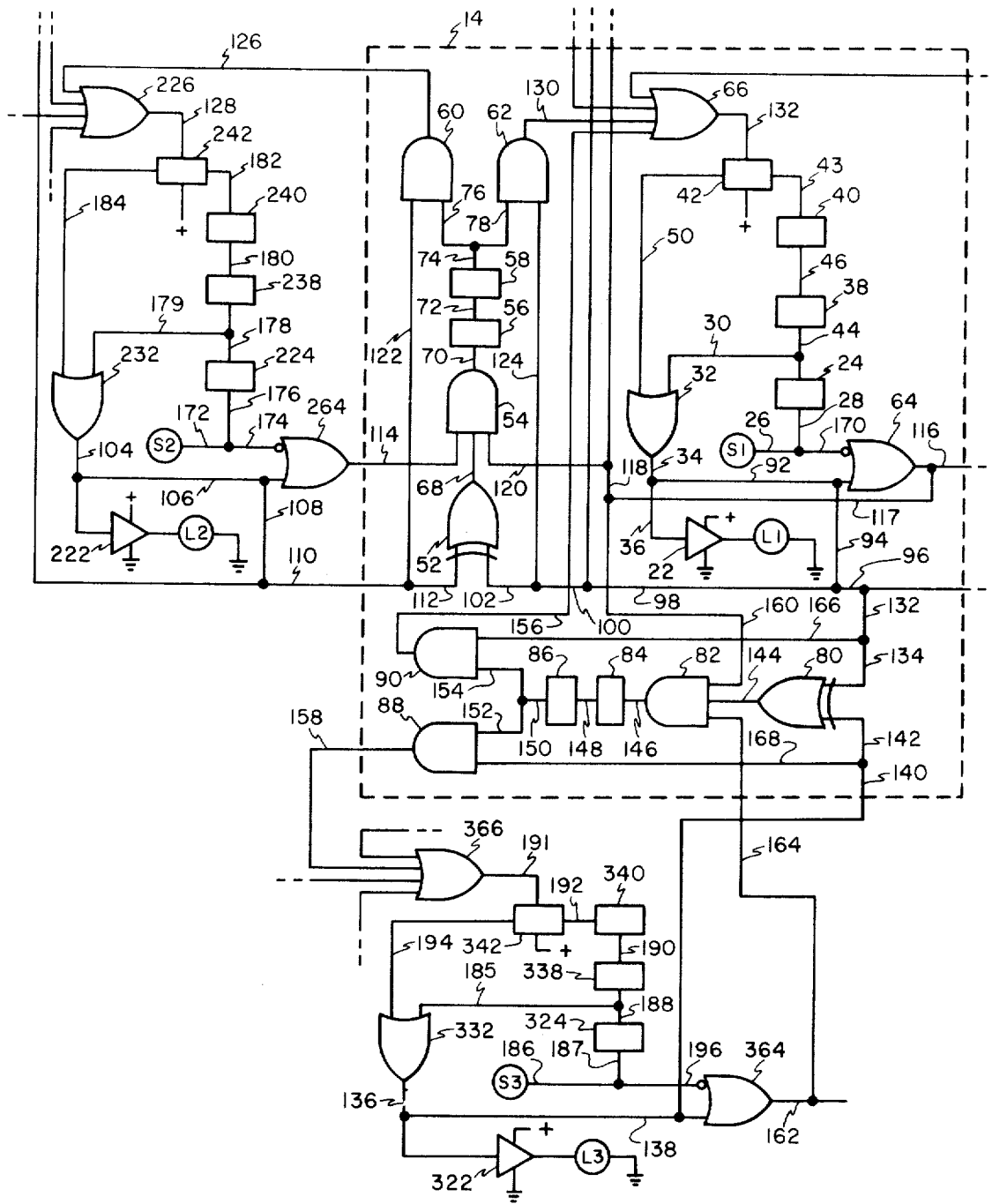
FIG. 3 is a circuit diagram of one of the identical modules of FIG. 1 and its interlocking logic circuitry and also shows portions of adjacent interconnected modules, each module being associated with a light responsive sensor and associated light element.

A suitable logic module circuit 14 is shown in FIG. 3. For convenience of the drawing and description, the lights L and sensors S have been shown within the module 14 and within the portions shown of the logic circuit of adjacent modules.

Referring to FIG. 3, in module 14 is provided a light L1 and light responsive sensor S1. Activating means in the form of a light inverter driver circuit 22 connected to a source of power indicated is provided to activate the light L1 to normally "on" condition. To provide for deactivating the light L1 to "off" condition responsive to actuation of the Sensor S1, a triggering circuit 24 is provided. The triggering circuit 24 is connected to receive the output of sensor S1 through lines 26 and 28 and to pass a deactivating signal to the inverter driver 22 via line 30, OR gate 32 and lines 34 and 36. Thus, when the sensor S1 is activated by a light source (not shown) simulating the use of a fire hose (not shown) the light L1 is extinguished simulating the extinguishing of a portion of the overall fire area.

Normally an area of fire will remain extinguished if the area is hosed for a selected period of time. To simulate this condition, time delay means is provided in the form of a capacitor and resistance circuit 38, a triggering circuit 40 and a flip-flop 42. The capacitor and resistive circuit 38 is connected by line 44 to receive the output of the trigger circuit 24. After a time delay necessary to charge the capacitor of circuit 38, its output is passed on line 46 to the trigger circuit 40 which via a line 48 sets the flip-flop 42 to pass a signal on a line 50 through OR gate 32 and lines 34 and 36 to the driver 22 to maintain the light L1 in "off" condition. The light L1 then remains in "off" condition unless there is such delay in extinguishing the lights of adjacent nodes of the light matrix as to cause a reflash effect and re-ignition of light L1. The additional interlocking logic circuitry for accomplishing this effect will now be described.

This interlocking circuitry as shown in FIG. 3 includes gate, trigger and additional time delay means. More specifically, there is provided in accordance with the invention an exclusive OR gate 52, an AND gate 54, a charging capacitor 56, a trigger circuit 58, AND gates 60 and 62, an OR gate 64 with inverter at one input terminal as indicated and an OR gate 66. The output of the exclusive OR gate 52 is passed on a line 68 to AND gate 54, thence on a line 70 to the charging capacitor 56, thence on a line 72 to the trigger circuit 58 and thence on lines 74, 76, and 78 to the AND gates 60 and 62. In the module 14 is provided a portion of logic circuitry identified by the elements 80, 82, 84, 86, 88, and 90 which are identical to the respective elements 52, 54, 56, 58, 60, and 62 and connected in the same manner described above.

It is to be understood that all of the several modules connected to the lights and sensors are identical. Therefore, a complete showing of all the modules is unnecessary. However, in order to explain the interconnecting logic circuitry of modules representing adjacent nodes of the matrix and thereafter to explain the overall operation of the simulator, there is shown to the left of the module 14 and below the module 14, a portion of each of the adjacent modules. This, to the left of the module 14 are shown the elements S2, L2, 222, 264, 232, 224, 238, 240, 242, and 266 corresponding to the elements S1, L1, 22, 64, 32, 24, 38, 40, 42, and 66 of the module 14. Below the module 14 are shown the elements S3, L3, 322, 364, 332, 324, 338, 340, 342, and 366 again corresponding to the elements S1, L1, 22, 64, 32, 24, 38, 40, 42, and 66 of module 14.

Considering now the interconnection between adjacent modules, the exclusive OR gate 52 of module 14 is connected to function in accordance with the condition of the lights L1 and L2. If the lights L1 and L2 are in the same state, i.e., both "on" or both "off," there is no output signal. However, if they are in different conditions, one "on" and the other "off," an output signal is developed. Thus, one input to the gate 52 is obtained via lines 34, 92, 94, 96, 98, 100, and 102 from the output signal of OR gate 32 determining the condition of light L1. Another input to exclusive OR gate 52 is obtained via lines 104, 106, 108, 110, and 112 from OR gate 232.

The output of exclusive OR gate 52 is passed on line 68 as one input to AND gate 54. A second input to AND gate 54 is provided from inverter OR gate 264 via a line 114 and a third input to the AND gate 54 is provided from inverter OR gate 64 via lines 116, 117, 118, and 120. AND gate 54 provides an output signal only when all three input lines are energized. AND gate 60 is provided with an input via lines 104, 106, 108, 110, and a line 122. AND gate 62 is provided with an input via lines 34, 92, 94, 96, 98, 100 and a line 124. The output of AND gate 60 is passed on a line 126 to OR gate 266 and thence on a line 128 to flip-flop 242 to reset flip-flop 242 and turn light L2 to "on" condition. Similarly, the output of AND gate 62 is passed on a line 130 to OR gate 66 and thence on a line 132 to reset flip-flop 42 and turn light L1 to "on" condition.

The interconnection of module 14 to the module next adjacent below it is accomplished in the same manner as described above for module 14 and its left adjacent module. Thus, in module 14 the exclusive OR gate 80 is connected to the signal source for light L1 via lines 34, 92, 94, 96, 132, and 134 and is connected to the signal source for light L3 via lines 136, 138, 140, and 142. The output of exclusive OR gate 80 is passed through AND gate 82, capacitor-resistor circuit 84 and trigger circuit 86 to the AND gates 88 and 90 via lines 144, 146, 148, 150, 152, and 154. The output of AND gate 90 is passed on line 156 to OR gate 66 and the output of AND gate 88 is passed on line 158 to OR gate 366. AND gate 82 is connected to inverter OR gate 64 via lines 116, 117 and 160, and to inverter OR gate 364 via lines 162 and 164. The one terminal of AND gate 90 is connected by line 166 to line 132 to condition gate 90 to the condition of light L1. The one terminal of AND gate 88 is connected by line 168 to line 140 to condition gate 88 to the condition of light L3. Sensor S1 is connected to inverter OR gate 64 via lines 26 and 170. Sensor S2 is connected to inverter OR gate 264 via lines 172 and 174 and to OR gate 232 via lines 172, 176, trigger 224 and lines 178 and 179. Sensor S2 is connected to flip-flop 242 via lines 172 and 176, trigger 224, line 178, capacitor-resistor circuit 238, line 180, trigger 240, and line 182 to set the flip-flop 242 and thence by line 184 to OR gate 232. Sensor S3 is connected to flip-flop 342 via line 186, line 187, trigger 324, line 188, capacitor-resistor circuit 338, line 190, trigger 340, and line 192 and thence via line 194 to OR gate 332. Sensor S3 is connected to the inverter terminal indicated of OR gate 364 via lines 186 and 196, and to OR gate 332 via lines 186, 187, trigger 324, line 188 and line 185.

OPERATION

Considering operation of the simulator, as shown in FIG. 1, a sensor and light are located in each area of adjacent areas forming a matrix of sensor and light pairs to represent adjacent areas of an overall fire area. The lights L1, L2 and L3 as shown in FIG. 2 are in normally "on" condition representing fire condition. Each light is initially extinguished by activation of its associated sensor by directing a ray of light on the sensor, such action representing hosing of that area of the fire.

Thus, activation of sensor S2, for example, produces an output signal via trigger 224 and OR gate 232 to act upon the inverter driver 222 and extinguish light L2. If the activation of sensor S2 is immediately removed, the loss of signal to driver 222 will reignite light L2 simulating the condition of reflash. However, if activation of sensor S2 continues for a time period dependent upon the time constant of the capacitor-resistor circuit 238, the flip-flop 242 will be activated to set condition and an output signal thereof via OR gate 232 will maintain an input signal to driver 222 and thereby maintain light L2 extinguished. This condition will prevail until the flip-flop 242 is reset by a signal on line 128 from OR gate 266, as will be hereinafter explained.

If the simulated hosing operation is now transferred to the fire area represented by sensor S1 and light L1, sensor S1 will be activated, producing a signal via trigger 24 and OR gate 32 to energize inverter driver 22 and extinguish light L1. If the simulated hosing of sensor S1 is immediately removed, the light L1 will reignite indicating insufficient time of hosing and resultant reflash of light L1. If the hosing is continued for a period of time dependent upon the delay time constant of capacitor-resistor circuit 38, flip-flop 42 will be set via trigger 40 and a holding output signal will be applied to the inverter driver 22 via the OR gate 32 from flip-flop 42.

Transferring the simulated operation to the fire area represented by sensor S3 and light L3, activation of sensor S3 immediately extinguishes light L3 via the operation of trigger 324, OR gate 332 and inverter driver 322. Continued hosing of the area for a selected time period avoids reflash by setting the flip-flop 342 via capacitor-resistor circuit 338 and trigger 340 such that the output from the set flip-flop 342 is applied through OR gate 332 to maintain inverter driver 322 energized and light L3 extinguished.

We have described thus far the means for simulation of fire in adjacent fire areas, the means for progressively extinguishing adjacent fire areas, and the time delay holding circuit means for hosing a specific area a sufficient time to prevent reflash from the heat of the individual area being extinguished. There is, however, under actual fire conditions the risk of reignition of one fire area due to an overtime exposure thereof to an adjacent fire area which is in ignited condition. To simulate this effect and teach the need for timely extinguishing of adjacent fire areas, the interlocking logic circuitry with additional time delay means is provided for application. Thus, assuming the fire in the area of light L2 is extinguished properly, the flip-flop 242 is in set condition, and that the sensor S1 is being activated to extinguish the light L1, the inputs to AND gate 54 are then as follows. Line 106 is receiving a signal from flip-flop 242 and passing a signal through gate 264 to line 114. There is no output from inverter gate 64 and hence no signal on input line 120 of AND gate 54. There is also no signal on input line 68 to AND gate 54 because both lights L2 and L1 are in the same condition and the exclusive OR gate requires a difference in input signals to develop an output signal. AND gate 54 requires an input on all three input lines to provide an output signal and hence there is no output signal on line 70.

Assuming that activation of S1 is continued until flip-flop 42 is activated to set condition, the conditions are then as follows. Line 114 remains carrying an input signal to AND gate 54. Line 68 from OR gate 52 carries no input signal because lights L2 and L1 are in the same condition, i.e., extinguished. Line 120 to AND gate 54 is carrying an input signal from inverter OR gate 64 via lines 116, 117, and 118. There is still no output from AND gate 54 because there is no input signal on line 68 to AND gate 54.

There is now a time period in which the fire in the area of light L3 must be properly extinguished to avoid a reflash of the fire area of light L1. If one does not proceed expeditiously to extinguish light L3, the following conditions prevail with respect to the inputs to AND gate 82. Line 160 via line 117 carries a signal from the output of OR gate 64. Line 144 carries a signal from exclusive OR gate 80 because light L1 is extinguished and light L3 is "on." In other words, one input to OR gate 80 is energized via lines 92, 94, 96, 132, and 134. The other input line 142 to OR gate 80 is passing no signal because there is no signal on line 138 connected to line 142 via line 140. The third input line 164 to AND gate 82 is carrying a signal from OR gate 364 from line 162. All three inputs to AND gate 82 being energized, the AND gate 82 will after a time delay pass an input to AND gate 90 via line 146, capacitor-resistor circuit 84, line 148, trigger 86 and lines 150 and 154. The other input to AND gate 90, line 166 is also energized via lines 132, 96, and 94, 92 and 34 from OR gate 32, thereby providing an output on line 156 from AND gate 90 and an input to flip-flop 42 via OR gate 66 and line 132. This signal resets flip-flop 42 and cuts off the holding signal activating driver 22 via line 50, OR gate 32 and lines 34 and 36. Light L1 is thereby reignited simulating reflash condition.

However, if light L3 is properly extinguished within the time period established by the capacitor-resistor circuit 84, then lights L1 and L3 will be in the same condition and there will be no further output from OR gate 80 and reflash of light L1 will be avoided. The same simulation of reflash is obtained for overtime exposure of an extinguished fire area to any other non-extinguished area. For example, if the fire areas L2 and L3 had been extinguished and there was undue delay in extinguishing the area of light L1, then AND gate 88 would be brought into operation to reset flip-flop 342 via OR gate 366 and light L3 would be caused to flash back to "on" condition.

In summary the above described system simulates all of the characteristics of an actual fire requiring sufficient time of hosing each fire area to prevent immediate reflash and at the same time an expeditious movement from one area to another to prevent reflash due to overtime exposure of an extinguished area to an adjacent unextinguished area which also would result in reflash.

Figure 4:
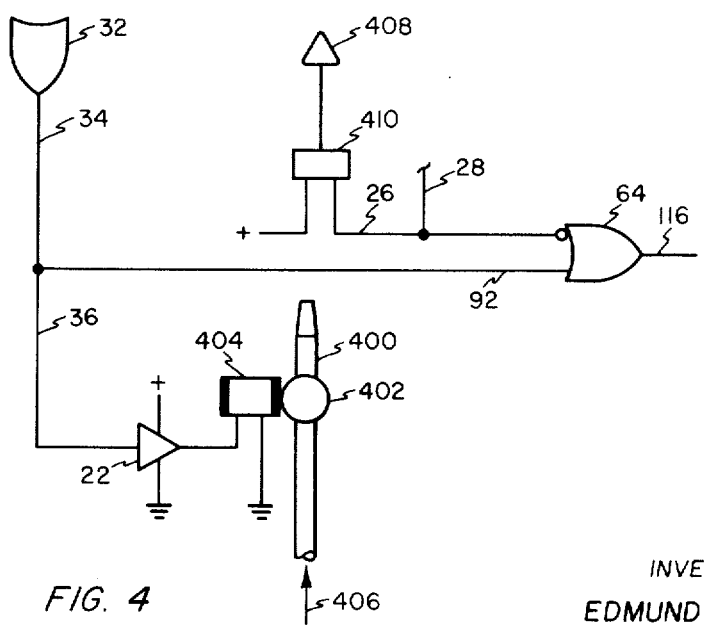
FIG. 4 shows diagrammatically a modification of FIG. 3 utilizing a gas burner and associated sensor in place of the light and light responsive sensor of FIG. 3.

It is to be understood that various modifications and substitutions can be employed in the above described circuitry without departing from the basic invention involving the provision of the above described interlock logic system. Thus, for example, as shown in FIG. 4, one may employ a gas burner 400, relay controlled valve 402 and relay 404 in place of the lamp L1. The burner is supplied with gas from a source indicated by the arrow 406 and the valve 402 is operated to "on" condition by the relay 404 responsive to the output of the driver 22. No modification is required in the remainder of the circuitry previously described. The valve 402 could alternatively be motorized instead of relay operated. Also, in place of the sensor S1, one may employ a water responsive vane type switch as indicated by a vane 408 connected to a micro-switch 410 supplied from a source of electrical energy indicated for providing an output to the inverter terminal of the inverter OR gate 64. One could also employ as the sensor a tank (not shown) for accumulating a quantity of water to activate the micro-switch when the water reaches a predetermined weight. The tank (not shown) would have a continuous bleed-off to reset the switch when the water is not being accumulated.

I claim:
1. A fire simulator for training in fire fighting and control comprising:
   a. a plurality of fire simulation units and a plurality of sensor means for arrangement in a matrix of pairs of fire simulation unit and associated sensor,
   b. a logic system of electrically interconnected modules connected to said sensors and simulation units, each of said modules including
   c. activating means for connecting said units to a source of energy for normally "on" condition,
   d. deactivating means including a trigger circuit connected to said activating means and responsive to activation of said sensor for deactivating said activating means and thereby extinguishing said fire simulation unit,
   e. a holding circuit including time delay means for holding said unit in "off" condition responsive to maintaining said sensor activated for a selected time period, and
   f. time delay interlocking logic circuitry means including a plurality of interlocking logic circuits connecting each module to its adjacent modules to permit and inhibit reflash capability in each "off" condition fire simulation unit in dependence upon the time duration of its exposure to "on" condition simulator units in adjacent modules.

2. Apparatus according to claim 1,
   a. said simulator units comprising electric lamps, and
   b. said sensor comprising a photoelectric cell.

3. Apparatus according to claim 1,
   a. said simulation units comprising a gas valve means, pilot light and burner, and
   b. said sensor means comprising a water pressure responsive actuating means for said gas valve means.

4. Apparatus according to claim 1,
   a. said activating means comprising an inverter driver circuit,
   b. said deactivating means including a trigger circuit, a first OR gate and inverter driver circuit,
   c. said trigger circuit being connected to said sensor for passing an output signal through said first OR gate to said driver circuit to condition said simulation unit to "off" condition responsive to actuation of said sensor.

5. Apparatus according to claim 4,
   a. said holding circuit including a capacitor-resistor circuit connected to said trigger circuit,
   b. a second trigger circuit connected to receive an output from said capacitor-resistor circuit after a time delay necessary to charge the capacitor of said circuit,
   c. a flip-flop circuit connected to said OR gate, and
   d. a trigger circuit connected to set said flip-flop to "on" condition to pass a signal to said OR gate responsive to an output signal from said capacitor-resistor circuit.

6. Apparatus according to claim 5,
   a. each of said interlocking logic circuits including
   b. an exclusive OR gate having two inputs connected respectively to the output of said first OR gate of its unit module and to the output of said first OR gate of a next adjacent unit module to sense the relationship of identical or different light conditions in adjacent modules and to provide an output signal only when said conditions are different,
   c. an inverter OR gate having an inverter input terminal connected to said sensor and another input terminal connected to the output of said first OR gate,
   d. a triple input AND gate having one input connected to receive the output of said exclusive OR gate and its remaining input terminals connected respectively to the outputs of said inverter OR gate in its unit module and in an adjacent unit module, said AND gate providing an output signal only when all three inputs are energized,
   e. a reset AND gate and an additional time delay means including a capacitor circuit and a trigger circuit connected to receive the output of said triple input AND gate and provide one input to said reset AND gate, the other input to said reset AND gate being obtained from the output of said inverter OR gate, and
   f. a reset OR gate connected to receive the outputs of the reset AND gate in its unit module and the reset AND gate in each adjacent unit module.

* * * * *